United States Patent [19]
Takada, deceased et al.

[11] 4,036,322
[45] July 19, 1977

[54] AUTOMATIC LOCKING SAFETY BELT RETRACTOR REEL

[76] Inventors: Takezo Takada, deceased, late of Hikone, Japan, by Juichiro Takada, legal authorized heir, 3-12-1, Shin, Setagaya, Tokyo, Japan

[21] Appl. No.: 663,169
[22] Filed: Mar. 2, 1976

Related U.S. Application Data

[63] Continuation-in-part of Ser. No. 462,678, April 19, 1974, abandoned.

[30] Foreign Application Priority Data

Apr. 25, 1973  Japan .................... 48-046136

[51] Int. Cl.² .............. A62B 35/02; B65H 75/48
[52] U.S. Cl. .............. 180/82 C; 242/107.4 B; 297/388
[58] Field of Search .......... 242/107.4 R–107.4 E, 242/107.2; 280/744–747; 180/82 C; 297/388

[56] References Cited

U.S. PATENT DOCUMENTS

| | | | |
|---|---|---|---|
| 3,266,842 | 8/1966 | Board et al. .................. | 297/388 |
| 3,510,085 | 5/1970 | Stoffel .................. | 242/107.4 B |
| 3,603,525 | 9/1971 | Pringle .................. | 242/107.4 D |
| 3,741,496 | 6/1973 | Beller .................. | 242/107.4 B X |
| 3,804,192 | 4/1974 | Takada .................. | 180/82 C |
| 3,836,171 | 9/1974 | Hayashi et al. ......... | 242/107.4 R X |

Primary Examiner—Stanley N. Gilreath
Assistant Examiner—John M. Jillions
Attorney, Agent, or Firm—Wolder & Gross

[57] ABSTRACT

An automatic braking safety belt retractor reel includes a reel provided with a first ratchet reel rotatable with a shaft and spring biased in a belt retracting direction. A braking pawl is movable into engagement with the ratchet reel by a rockable second ratchet wheel which is advanced by a second pawl pivoted on an inertial wheel and urged into engagement with the ratchet wheel by a cam on the shaft when the inertial wheel lags the rotation of the cam as a result of the rapid shaft acceleration. An armature of magnetic material is mounted on a second pawl and an electromagnet having an annular core, when excited, attracts the armature to prevent the engagement of the second ratchet wheel by the second pawl and the braking of the reel. The electromagnet is excited upon occupation of the seat or closing of the vehicle door and is de-excited upon buckling of the belt.

7 Claims, 6 Drawing Figures

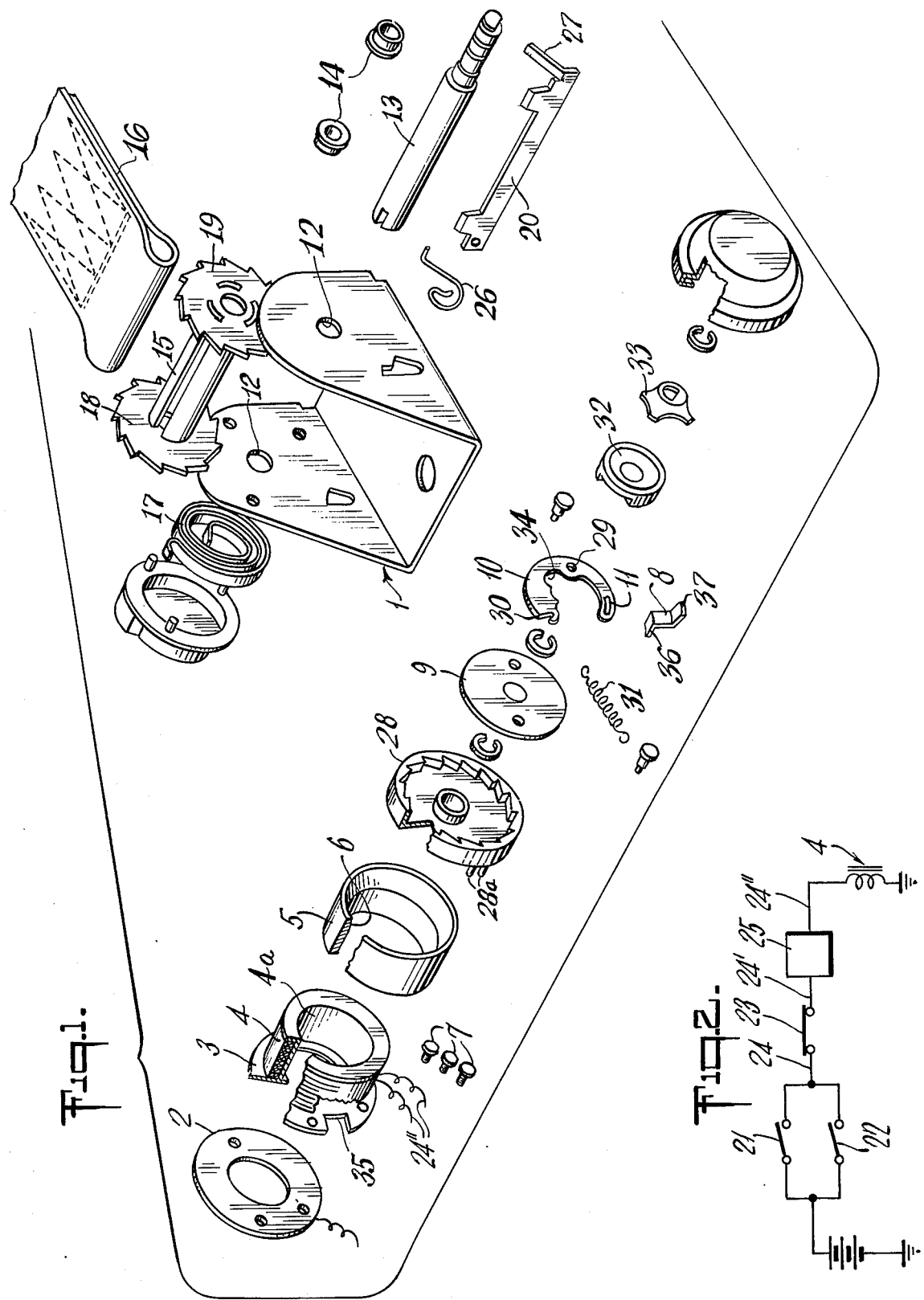

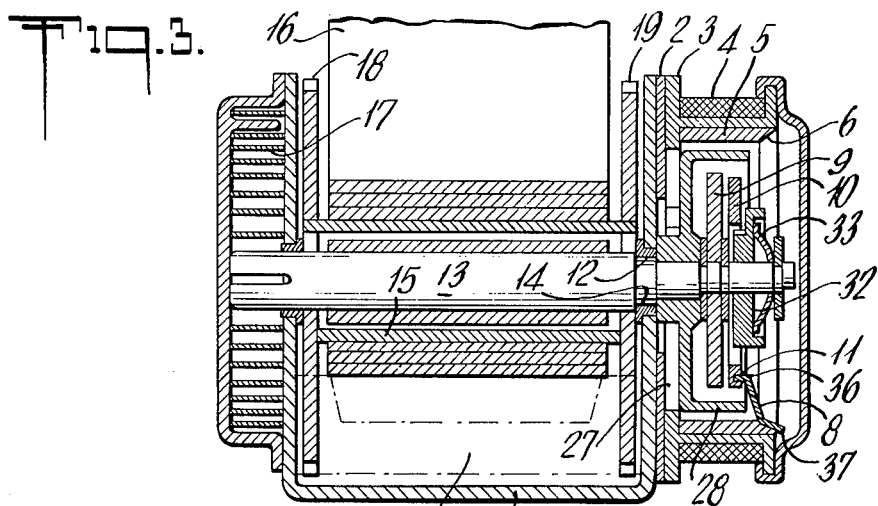
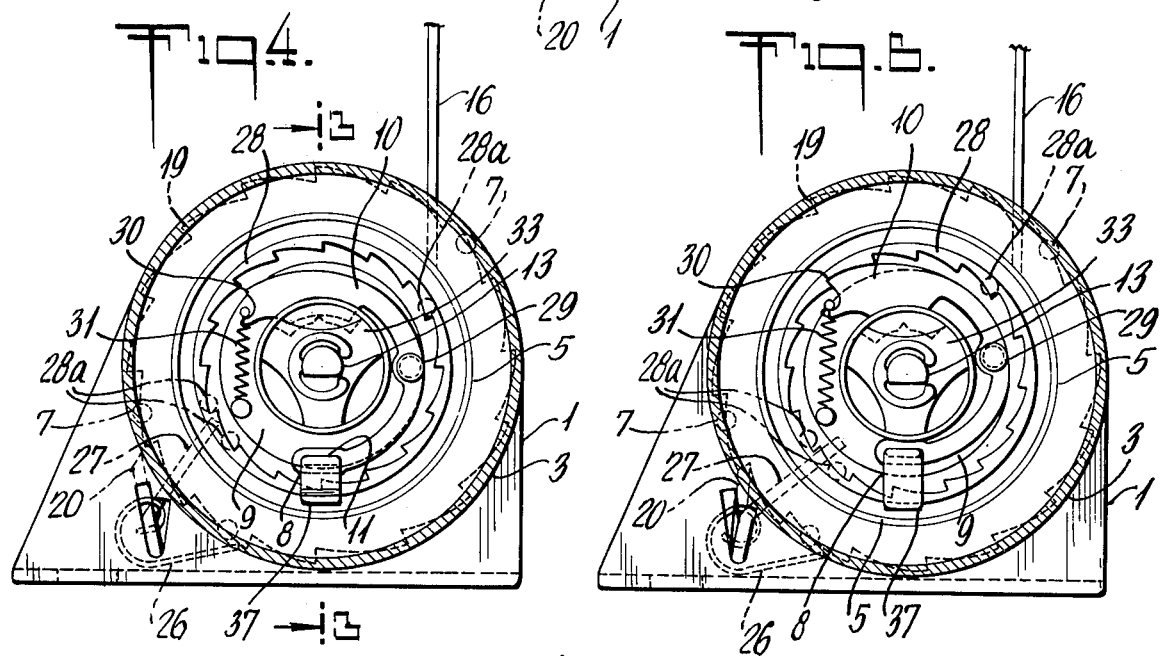
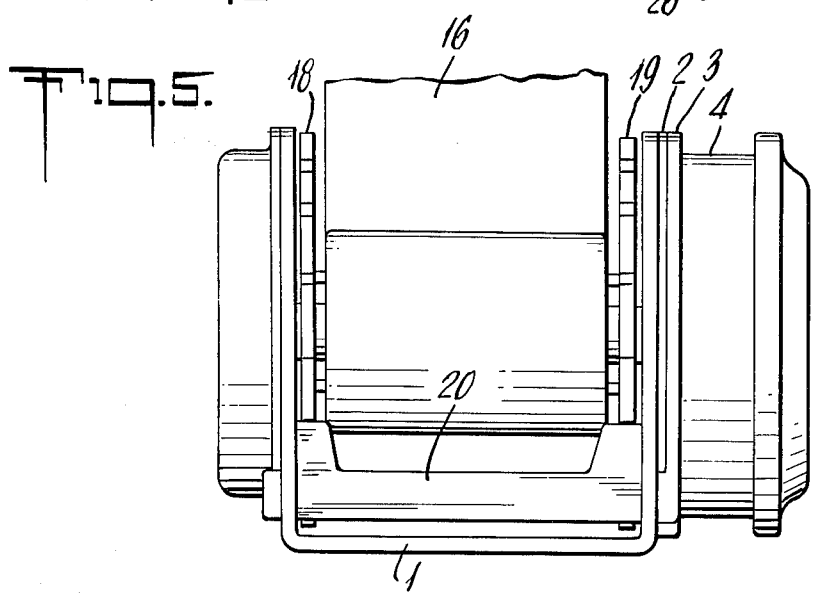

AUTOMATIC LOCKING SAFETY BELT RETRACTOR REEL

REFERENCE TO RELATED APPLICATION

The present application is a continuation-in-part of co-pending patent application Ser. No. 462,678, filed Apr. 19, 1974, now abandoned.

BACKGROUND OF THE INVENTION

The present invention relates generally to improvements in vehicle safety belt retractors and it relates more particularly to an improved vehicle safety belt retractor reel mechanism of the type which automatically prevents the extraction of the belt upon the sharp withdrawal of the belt consequent to an abnormal vehicle condition which tends to propel the occupant from the seat.

Many types of safety belt retractor systems are known which normally permit the free movement of a vehicle seat occupant under normal conditions, but automatically lock the retractor against belt withdrawal under abnormal or emergency conditions, which tend to throw the occupant from the seat, such as in the case of a collision or rapid deceleration or vehicle overturning. A well known type of such an automatic locking belt retractor reel which possesses many advantages is of the so called inertia type locking reel in which a sharp acceleration of the belt wind-up reel in the belt extraction direction attendant to a sharp withdrawal of the safety belt automatically locks the reel against further belt withdrawal, thereby safely retaining the occupant in the seat and preventing or minimizing injury. However, this inertia type retractor reel possesses an important drawback in that it responds to rapid belt withdrawal whether intentional and desired, or as a result of emergency. Thus, if the seat occupant does not withdraw the belt for application sufficiently slowly and uniformly, but in a jerky manner, the reel braking mechanism is actuated, preventing adequate belt extraction and requiring a repetition of the belt withdrawal procedure, a practice which is highly inconvenient and annoying, and often results in the seat occupant not applying the safety belt.

SUMMARY OF THE INVENTION

It is a principal object of the present invention to provide an improved vehicle safety belt system.

Another object of the present invention is to provide an improved safety belt retractor.

Still another object of the present invention is to provide an improved inertia type automatic locking vehicle safety belt retractor reel.

A further object of the present invention is to provide an improved inertial locking belt retractor reel which permits the full and rapid withdrawal of the belt attendant to the application thereof. Another object of the present invention is to provide a device of the above nature characterized by its ruggedness, reliability, convenience and ease of use and high versatility and adaptability.

In a sense, the present invention contemplates the provision of an automatic locking vehicle safety belt reel including a belt reel rotatable in opposite belt extraction and retraction directions, spring means urging the reel to rotate in a belt retraction direction, means transferable from a reel release condition to a condition braking said reel against rotation in a belt extraction direction in response to the angular acceleration of the reel in a belt extraction direction exceeding a predetermined value, and means for retaining the braking means in its reel release condition independently of said angular acceleration.

In the prefered form of the improved reel mechanism, the reel is rotatable with a shaft journalled between the side plates of a U-shaped bracket and includes first ratchet wheel end flanges and a first pawl member is rockably supported by the end plates for movement into and out of engagement with the ratchet wheels and spring urged to a ratchet release position. A second ratchet wheel is rotatably mounted on the shaft and engages the first pawl to urge it to engage the first ratchet wheel with advance of the second ratchet wheel and an inertial wheel rotatable on the shaft carries a pivoted second pawl swingable into engagement with the second ratchet wheel and spring urged out of engagement. A cam member is also mounted on the shaft and upon sufficient acceleration of the shaft, the inertial wheel sufficiently lags the cam so that it advances the second pawl into engagement with the second ratchet wheel, causing it to advance the first pawl member. An electromagnet includes a tubular core establishing, when excited, a circular magnetic field and an armature of magnetic material is mounted on the second pawl member and traverses a circular path with the rotation of the fly wheel proximate the pole end of the magnetic core so that upon excitation of the electromagnet, the armature is attracted to maintain it out of engagement with the second ratchet wheel, but permits its free rotation with the inertia wheel. The solenoid of the electromagnet is connected to a source of current in series with a delay network, a normally closed switch which is opened upon buckling of the belt and a pair of normally open parallel connected switches which are closed upon closing of a vehicle door or occupation of the vehicle seat respectively.

The improved vehicle safety belt retractor is reliable, rugged, versatile and adaptable, and permits the rapid and convenient application of the belt to the seat occupant.

BRIEF DESCRIPTION OF THE DRAWINGS

FIG. 1 is an exploded partially fragmented perspective view of a retractor reel embodying the present invention;

FIG. 2 is a schematic view of the control circuit thereof;

FIG. 3 is a vertical medial sectional view of the retractor reel taken along line 3—3 in FIG. 4;

FIG. 4 is a side elevational view thereof with the enclosure cap removed;

FIG. 5 is a top plan view thereof with the reel pawl shown in lock position; and FIG. 6 is a view similar to FIG. 4 but with the reel pawl shown in lock position.

DESCRIPTION OF THE PREFERRED EMBODIMENT

Referring now to the drawings which illustrate a preferred embodiment of the present invention as applied to an inertia type automatic locking retractor reel of generally known construction, the retractor reel includes a U-shaped bracket or frame 1 having transversely aligned openings 12 in which a main shaft 13 is journalled by means of bearing bushings 14 and a reel 15 having the safety belt 16 attached to and windable thereon is affixed to the shaft 13 between the bracket side plates. A suitably housed spiral wind-up spring 17 is mounted on the outside face of one of the bracket side plates and biases the reel 15 in a belt retracting or wind-up direction. The reel is provided with first ratchet wheel defining side flanges 18 and 19 and a first pawl member 20 is rockably supported by the bracket side plates for movement into and out of engagement with the first ratchet wheels 18 and 19 and is urged by a wire spring 26 to a ratchet disengage position. The pawl member includes an actuating arm 27 along the outside face of a bracket side plate.

The inertia actuated reel locking mechanism includes an internally toothed second ratchet wheel 28 freely rockably mounted on the shaft 13 externally of the bracket and having projecting rearwardly therefrom a pair of peripherally spaced pins 28a which engage between them the free end portion of the first pawl actuating arm 27 to advance it to rock the first pawl member 20 into a reel locking condition with the advance rocking of the second ratchet wheel 28. Also rotatable on and relative to the shaft 13 is an inertia wheel 9 withing the second ratchet wheel 28 and a second pawl or click member 10 is eccentrically pivoted at 29 to inertia wheel 9 between the ends of the pawl member 10, and has an arcuate outer edge. The pawl member 10 is swingable between advance and retracted positions with a pawl element defining end 30 thereof engaging and disengaging the second ratchet member 28 and is urged by a helical spring 31 to its retracted position. Formed in the end of lever member 10 opposite the pawl end 30 thereof is a short longitudinal slot 11. Cam 32 is also carried by the shaft 13, and is rotatable with shaft 13 under the influence of a spider shaped leaf spring 33 mounted on shaft 13 and rotatable therewith and bearing on cam 32. The cam 32 is engaged by an inner follower portion 34 of pawl member 10 and the cam and pawl member 10 are so related and carried by the shaft 13 that a rapid angular or rotational acceleration of the shaft causes the inertial wheel 9 to lag in rotation relative to the cam member 32 which thereby advances the pawl member 10 to engage and rock the second ratchet wheel 28 which in turn advances the first pawl member 20 to engage the first ratchet wheels 18, 19 and lock the reel 15 against belt extraction rotation.

An annulus 2 of a magnetic insulation material, such as aluminum, is mounted on the outside face of the bracket side plate proximate the inertia brake actuating mechanism, and a coil or solenoid 4 is wound on a hollow short cylindrical core coaxial with the shaft 13 and terminating at its inner end in a peripheral flange 3 for mounting the solenoid and having a recess 35 in its periphery for swingably accommodating the end portion of the pawl cross-piece terminating in the first pawl member actuating arm 27. A core 5 in the shape of a collar is formed of a magnetic material and telescopes the form or sleeve 4a of solenoid 4 and is tapered at its outer inside peripheral border to generate, upon energization of the solenoid 4, and internal annular and tapered magnetic field 6 at the inside end of the magnetic core 5. The core 5, together with the coil 4 are mounted to the side wall of the bracket 1 by way of the insulator disc 2 and the coil 4 is electrically connected by conductor leads 24 to a solenoid energizing control network, as shown in FIG. 2.

An armature 8 or magnetic pole piece is formed of a magnetic material and firmly mounted to the end of pawl lever 10 remote from the pawl element end 30 thereof and includes a longitudinally extending leg 36 engaging and affixed in slot 11 and a radially, outwardly extending arm terminating in a longitudinally, outwardly projecting free leg 37 of arcuate cylindrical shape with an outside face parallel to and coaxial with the inside face of the electromagnet core 5. The free leg 37 of armature 8 is movable with the swinging of pawl member 10 to its ratchet engage and disengage positions, to positions relatively far and close to the inside pole face of core 5 so as to permit the rotation thereof with inertia wheel 9. Upon energization or excitation of solenoid 4, the armature 8 is attracted and moved radially, outwardly, to retain the pawl member 10 in its ratchet disengage position.

The control network includes a door switch 21 which is closed and opened with the opening and closing respectively of the vehicle door, and a seat switch 22 connected in parallel with switch 21, which is closed and open with the occupation and unoccupation respectively of the vehicle seat. There is also provided a buckle switch 23 which closes and opens with the unbuckled and buckled condition respectively of the safety belt coupling buckle and a timer switch 25. The solenoid 4 is connected by one lead 24" to ground and by its opposite lead to the one terminal of time switch 25, whose other terminal is connected by a lead 24' to one terminal of buckle switch 23, whose other terminal is connected by a lead 24 through the parallel switches 21 and 22 to one pole of a current source battery, whose other pole is grounded. Thus, when the vehicle door is open to close switch 21, the solenoid 4 is energized to maintain the reel 15 in its released condition, and upon occupation of the seat the switch 22 is closed to continue the energization of the solenoid, even following the closing of the door. Upon coupling of the belt buckle, the buckle switch 23 is opened and a predetermined time interval thereafter the timerswitch 25 is opened. The coil 4 is thus deenergized a short time following the coupling engagement of the buckle.

Considering now the operation of the improved mechanism, when a passenger opens the door, the door switch 21 is closed to feed current to and excite the coil 4, and when he sits on the seat, the current is likewise supplied to the coil 4 by the closing of the seat switch 22. The current remains flowing even after the door is closed. When the coil 4 is fed with current and energized, the iron core 5 is magnetized so that the armature or magnetic pole 8 is attracted, leaving a slight space for the magnetic field 6 of iron core 5. The pawl element portion 30 of the pawl member 10 mounted on the inertial wheel 9 is thus separated and disengaged from the teeth of the internally tooth second ratchet wheel 28. As a consequence, second ratchet wheel 28 is free to rock or rotate so as to permit the rocking of arm 27 whose end is engaged between the ratchet wheel mounted pins 28a and the spring influenced movement of pawl 20 to a position releasing ratchet wheels 18, 19. During the period of the separation of pawl 10 from the second ratchet wheel 28, the pawl 10 does not effect any reel braking action of the inertial wheel mechanism however rapidly the passenger may manually extract or unwind the safety belt. The emergency locking device remains disabled or deactuated and unlocked during the current supply to an energization of coil 4. However, when the passenger is fitted with the safety belt and the buckle engaged and coupled, the buckle switch 23 acts after a certain period by way of the timer switch 25 to interrupt the current through the coil 4. Then the magnetic field 6 is collapsed to release the magnetic pole or armature 8, and thus the inertial wheel braking mechanism operates to function as the emergency locking device, as described earlier. Upon a highly accelerated extraction of belt 16, reel 15 and shaft 13 are highly accelerated with fly wheel 9 lagging the rotation of cam 32 which rotates with shaft 13 by reason of the high inertia of fly wheel 9. The cam 32 thus swings pawl 10 against the influence of spring 31 to bring the pawl end 30 into engagement with second ratchet wheel 28 to swing the ratchet wheel. The swung ratchet wheel 28, by way of pins 28a and arm 27, rocks the pawl 20 to lock ratchet wheels 18, 19 and brake the reel 15 against further belt extraction.

The mechanism as hereinbefore described for maintaining the unlocked condition of the emergency locking device until the engagement of the safety belt buckle means of an electromagnet may be modified without departing from the scope of the present invention. For example, there may be effected a change in the arrangement such that the electromagnet or solenoid is disposed on the lateral side of the inertial wheel braking mechanism, a change of position of the magnetic field with the profile in the cross-section of the iron core of electromagnet being L-shaped, a change of the actuation direction of the pawl by homopolar repulsion such that a permanent magnet be employed as the armature or magnetic pole, and unlocking by a solenoid plunger in the lateral side direction such that a magnetic pole of a cam action lug is disposed adjacent to the ratchet engagement portion of pawl, or the conversion of the inertial wheel braking mechanism to the electrically unlocked condition such as by a change in the methods of arranging and connecting the various switches.

I claim:

1. An automatic braking safety belt retractor comprising a belt reel rotatable in opposite belt extraction and retraction directions, spring means urging said reel to rotate in a belt retraction direction, means for fastening the safety belt about the body of an occupant, inertia activated braking means transferable from a reel release condition to a condition braking said reel against rotation in a belt extraction direction in response to a function of the rotational speed of said reel exceeding a predetermined value, switch-actuated electromagnetic means for retaining said braking means in said reel release condition in response to the energization of said electromagnetic means prior to engagement of said safety belt fastening means regardless of the value of said function, means responsive to the occupation of a vehicle seat associated with said retractor for energizing said eletromagnetic means, a buckle carried by the belt wound on said reel and means responsive to the coupling engagement of said buckle for deenergizing said eletromagnetic means and deactuating said retaining means independently of the occupation of said seat.

2. The retractor of claim 2, including a shaft and a brake ratchet wheel rotatable with said reel, said braking means including a ratchet wheel mounted on said shaft for rocking between advanced and retracted positions, a brake pawl member movable between reel braking and release conditions respectively engaging and disengaging said brake ratchet wheel in response to the advance and retraction respectively of said ratchet wheel, an inertia wheel rotatable on said shaft, a pawl member eccentrically swingably mounted on said inertia wheel and movable into and out of engagement with said ratchet wheel and spring urged to a disengage position and having a follower portion, a cam carried by said shaft and engaging said follower to advance said pawl member to its ratchet engage position in response to said inertia wheel lagging said cam in rotation whereby to advance said ratchet wheel, and said electromagnetic means including an armature of magnetic material movable with said pawl member between its ratchet wheel engage and disengage positions, and a solenoid device attracting said armature and moving said pawl member to its ratchet wheel disengage position in response to the excitation of said solenoid.

3. The retractor of claim 2 wherein said armature is mounted on said pawl member to traverse a circular path with the rotation of said inertia wheel and said solenoid includes a tubular core of magnetic material coaxial with and radially spaced from said circular path.

4. The retractor device claim 2 wherein said seat occupation responsive means includes a normally open first switch actuated to a closed condition in response to the occupation of said seat associated with said retractor, said solenoid being connected in series with said switch to a source of current.

5. The retractor device of claim 4 wherein said buckle coupling engagement responsive means includes a normally closed second switch actuated to an open condition in response to the coupling engagement of a buckle on the belt wound on said reel, said solenoid and said first and second switches being connected in series to a source of current.

6. The retractor of claim 1 wherein said function is the angular acceleration of said reel.

7. An emergency locking device for a safety belt retractor to prevent the safety belt from unwinding in case of an abnormal vehicle condition, said locking device comprising a pawl and an inertial mechanism member operatively coupled to said pawl for moving the latter to a position in which it locks the retractor against unwinding in response to a sharp withdrawal movement of the safety belt from the retractor, a switch actuated in response to the occupation of a vehicle seat, an armature of magnetic material disposed on a portion of said pawl and an electromagnet or solenoid disposed on the periphery or lateral side of the inertial mechanism member whereby upon actuation of said switch and until the engagement of the safety buckle, the electromagnet remains being magnetized so that the pawl of the retractor unlocks the retractor, and means responsive to the engagement of said buckle for deactivating the electromagnet or solenoid so that the locking device effects its operational function.

* * * * *